United States Patent [19]
Andrews et al.

[11] Patent Number: 5,291,492
[45] Date of Patent: Mar. 1, 1994

[54] EXTERNALLY CONTROLLED CALL PROCESSING SYSTEM

[75] Inventors: G. Wayne Andrews, Nashua, N.H.; Jeffrey A. Fried, Somerville, Mass.; Jerry Gechter, Lincoln, Mass.; Robert L. Pokress, Andover, Mass.

[73] Assignee: Unifi Communications Corporation, Billerica, Mass.

[21] Appl. No.: 809,346

[22] Filed: Dec. 18, 1991

[51] Int. Cl.$^5$ .............................. H04J 3/12
[52] U.S. Cl. .................. 370/110.1; 379/309; 379/202; 379/158; 379/157; 370/62
[58] Field of Search ............ 370/110.1, 85.1, 62, 370/85.12, 60.1, 60, 94.1, 85.6, 85.4, 85.13, 85.15, 94.3; 379/157, 94, 265, 201, 309, 164, 165, 166, 212, 213, 220, 308, 158, 202, 198, 215, 89

[56] References Cited

U.S. PATENT DOCUMENTS

| | | | |
|---|---|---|---|
| 4,160,131 | 7/1979 | Kaul et al. | 370/110.1 |
| 4,653,085 | 1/1987 | Chan | 379/94 |
| 4,763,353 | 8/1988 | Canale et al. | 379/157 |
| 4,872,159 | 10/1989 | Hemmady et al. | |
| 4,896,350 | 1/1990 | Bicknell et al. | 370/220 |
| 4,916,691 | 4/1990 | Goodman | 370/85.12 |
| 4,958,341 | 9/1990 | Hemmady et al. | 370/60.1 |
| 5,001,710 | 3/1991 | Gawrys et al. | 370/110.1 |
| 5,029,200 | 7/1991 | Haas et al. | 379/207 |
| 5,157,662 | 10/1992 | Tadamura et al. | 370/110.1 |
| 5,182,750 | 1/1993 | Bales et al. | 370/110.1 |

OTHER PUBLICATIONS

Hewlett Packard manual entitled "ACT-Call Processing API Reference Manual".
IBM Programming Announcement, "CallPath Product Family Overview", Sep. 11, 1991, #291-518.
IBM Programming Annoucement, "IBM CallPath CICS/MVS and CallPath CICS/VSE", Sep. 11, 1991, #291-519.
IBM Programming annoucement, "IBM CallPath/2, IBM CallPath/DOS for Windows, and IBM CallPath Toolkit for OS/2 and DOS", Sep. 11, 1991, #291-521.
IBM Programming Annoucement, "IBM CallPath Direct/Talk 6000 Voice Processing System IBM AIX DirectTalk/6000", Jul. 30, 1991, #291-353.
IBM Programming Annoucement, "IBM CallPath DirectTalk/2 Voice Processing System", Jul. 30, 1991, #291-360.
IBM Programming Annoucement, "IBM DirectRoute/2", Feb. 26, 1991, #291-075.
IBM CallPath Services Programmer's Reference, Prepface, Table of Contents, Chapter 1, (Nov. 1990).
(Draft) American National Standards Institute (ANSI) for Switch-Computer Applications Interface (SCAI) (T1S1.1/91-128).

Primary Examiner—Douglas W. Olms
Assistant Examiner—Dang Ton
Attorney, Agent, or Firm—Fish & Richardson

[57] ABSTRACT

A system for external control of call processing including a network controller that is connected to receive a third party control message regarding a call operation to be executed by one or more line controllers and is programmed to determine what first party steps need to be taken by the line controller or controllers to execute the call operation, to generate first party control messages to carry out the steps, and to send the first party control messages over a network via a message transfer interface to one or more line controllers, the line controllers being connected to the network via message transfer interfaces to receive the first party control messages and being programmed to execute the first party messages on the network.

58 Claims, 10 Drawing Sheets

EXTERNALLY CONTROLLED CALL PROCESSING SYSTEM

BACKGROUND OF THE INVENTION

The invention relates to control of call processing systems via an external computer application.

Telephone switch vendors and computer vendors have introduced products having the objective of allowing a telephone subscriber's data processing applications to control telecommunications switches, e.g., at central offices of the public telephone network. Architecturally these products tend to be similar and employ an application programming environment on a computer platform which allows a data processing application to interact with one or more switch products via some form of switch control link made available by the switch. The objective is to allow the computer to control and participate in the establishment of connections by the switch and to monitor selected actions taking place on the switch.

SUMMARY OF THE INVENTION

The invention features, in general, a system providing network-wide control of call processing by an external application. The system includes a network controller and a plurality of line controllers. The line controllers communicate with the network controller via message transfer interfaces to a network (e.g., the telephone network or a separate network), and the line controllers are connected to a network (e.g., the telephone network) via call control interfaces permitting the individual line controllers to cause the network to execute standard call processing functions. An external application provides the network controller with third party control messages regarding a desired call operation (e.g., establish a call between two parties on the network or transfer a call) to be performed by one or more line controllers. The network controller then determines what first party steps need to be taken by the line controller or controllers to execute the desired call operation, generates first party control messages to carry out the steps, and sends the first party control messages via a message transfer interface to the appropriate line controllers. The line controllers so instructed then execute the first party steps, thereby effecting the desired ultimate call operation on the network.

This permits an external computer application to do call processing on an entire network of multi-vendor switches as if there were only a single, logical switch. There is no requirement that the switch be one supporting a computer application link, and there is no concern that the external application might interfere with normal operation of the switch. The application program sees all the lines it controls as if they were part of a single switch, and the network controller and individual line controllers provide control and monitoring capabilities by appropriate interaction with the individual switches over those lines.

In preferred embodiments, a single network is used, and the line controllers are connected to it via network service interfaces including the features of the message transfer interface and the call control interface. The network service interface can be an integrated services digital network interface, and the first party control messages can be provided according to the X.25 standard.

The line controller can be implemented by a personal computer, a workstation, a telephone with specialized software and X.25 data features, or by a device having the dedicated function of control of communication via the message transfer interface and the call control interface. The line controller can be entirely automated or it can include an interactive display for interaction with a human line user. The line controller includes a communications layer, a network interface, and a line controller state machine. The line controller state machine includes the call states of a null state, a dialing state, an incoming state, a traffic state, a releasing state, a three-way state, and a hold state. An electronic device can be attached to the line controller, and messages can be sent over the message interface to control the electronic device. The functions of a line controller and external application could be implemented on the same platform.

The network controller can be separate from an external host processor that contains the applications programs relating to call processing carried out by the system and also contains information as to the business supported by the automatic call processing system. Alternatively, the same platform can be used to implement the network controller and perform these functions. The network controller includes a communications layer, a network interface, and an event handler.

A system operator station can be connected to receive information as to the operation of the automatic call processing system from the network controller and to provide control signals to the network controller.

The first party control messages can include initiating an outgoing telephone call over the network, receiving an incoming call over the network, transferring a telephone call to another telephone, putting a call on hold, clearing a connection, and retrieving a call. An API library can be accessed by the application program to generate the third party control messages.

Other advantages and features of the invention will be apparent from the following description of embodiments thereof and from the claims.

DESCRIPTION OF THE PREFERRED EMBODIMENT

Drawings

STRUCTURE

Figure 1:
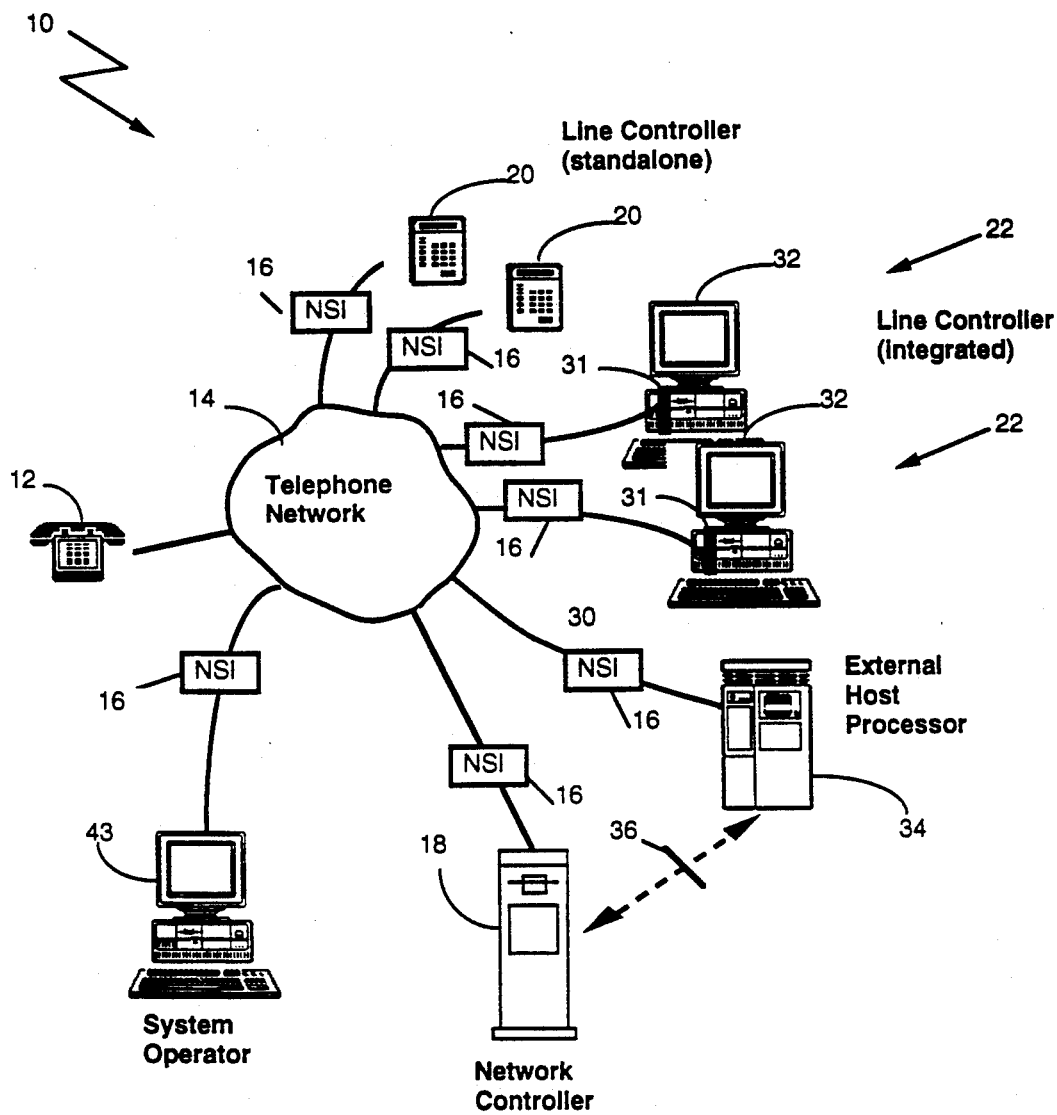
FIG. 1 is a block diagram of an automatic call processing system according to the invention.

Referring to FIG. 1, there is shown automatic call processing (ACP) system 10 for processing telephone calls to, from, or between line users at line controllers 20, 22 and/or an outside telephone 12. Each of the components of ACP system 10 is connected to public telephone network 14 via a network service interface 16, which in the preferred embodiment is an integrated systems digital network (ISDN) interface, as is described in more detail below. System 10 can be implemented by extending the automatic call distributing system described in U.S. Pat. No. 5,036,535 which is hereby incorporated by reference, to include the features described hereinafter.

Network controller 18 is used to process third party call processing requests from an external application on host processor 34 by determining the necessary first party steps to be taken by line controllers 20, 22 and generating the appropriate first party messages for the appropriate line controllers to effect the desired ultimate call processing operation. As used herein, "first-party" refers to call control done at an interface to control communications at that interface, and "third-party" refers to call control done at an interface to control communications elsewhere. Thus, control of a network by an external application is a case of third-party control. Network controller 18 also assures that line user and system performance data are collected as needed for management purposes.

Two implementations for line controllers are shown on FIG. 1: stand alone line controller 20 and integrated line controller 22. Stand alone line controller 20 is an independent device. Integrated line controller 22 is a personal computer (or workstation) 32 used to make connections with system 10 and has a card 31 for making the connections to the network. Line controllers 20, 22 are used by the line users to interact with system 10 and are controlled by network controller 18 via X.25 command messages transmitted over network 14, as is described in detail below.

External host processor 34 contains applications programs which invoke the call processing functions carried out by ACP 10. Host processor 34 can be directly connected to network controller 18 by an external processor interface 36 or can be remotely located from network controller 18 and connected to it via a network services interface 16. Alternatively, host processor 34 and line controller 18 can be implemented on the same computer, in which case interface 36 is a process-to-process interface within that computer. Examples of interface 36 are as described in Switch-Computer Applications Interface Working Document, ANSI Standards Group T1S1.1, Document T1S1.1 89-231, and Emil Wang, "Intelligent Call Processing in Automatic Call Distributors", Business Communications Review, January-February, 1988 and embodied in the following products: Call Path (IBM), Adjunct-Switch Application Interface (AT&T ISDN/DMI), and Computer Integrated Telephony (DEC).

In the presently preferred embodiment, ACP system 10 employs the integrated services digital network (ISDN) in order to carry out the processing of calls by line controllers 20, 22, to send messages to line controllers 20, 22, receive information on the status of the line controllers 20, 22, and to perform other communication and control functions. A network service interface 16 includes two functions that can be implemented over the same network or over two physically separate networks. The first function is that of a message transfer interface, which means an interface that permits the sending of messages over the network. The second function is that of a call control interface, which means an interface that permits the line controller to request the network to execute call processing operations. In the embodiment shown in FIG. 1, both the message transfer interface and the call control interface are implemented by network service interface 16 to the public telephone network 14. Network service interfaces 16 employ the ISDN interface to a telecommunications network as defined by international and domestic U.S. standard bodies. The interface supports a combination of circuit-switched and packet-switched information transfers with a separate message-based signalling channel for connection control. There are two major types of ISDN interface: a basic rate interface (BRI) at 144 kb/s and a primary rate interface (PRI) at 1544 kb/s (North America or Japan) or 2048 kb/s (Europe and most other regions). In the BRI, there are two 64 kb/s bearer (B) channels used for voice, data or other digitally encoded messages and a single 16 Kb/s delta (D) channel used to transmit status and other control messages between network controller 18 and the other components. In the PRI, there are 23 (U.S.) or 30 (Europe) B channels and one (64 kb/s) D channel. Line controllers 20, 22 typically employ BRIs, and network controllers 18 typically employ BRIs in small systems (e.g., less than 200 line controllers) and PRIs in large systems. With these interfaces there can be real time simultaneous transmission of control messages to the line controllers over the D channel at the same time that there is normal telephone operation over a B channel and transmission of status messages over a B channel or D channel. Communications between line controllers 20, 22 and host processor 34 could be over a B channel or the D channel, using either circuit-switched or packet-switched communication. Interface characteristics and capabilities are described in W. H. Harman and C. F. Newman, "ISDN Protocols for Connection Control", IEEE Journal on Selected Areas in Communication, Vol. 7, No. 7, September, 1989, and Stallings, W., "Tutorial, Integrated Services Digital Networks (ISDN)", (Second Edition 1988), Library of Congress No. 87-83433, IEEE Catalog No. EH0270-9, and Bocker, P., "ISDN, The Integrated Services Digital Network, Concepts, Methods, Systems" (Springer-Verlag Berlin, Heidelberg 1988), which are hereby incorporated by reference.

Internationally, the ISDN standards are defined by the CCITT I series of recommendations (I.110–I.470). The standards most directly relevant to the invention are I.430/431 (physical layer), I.440/441 (link layer), and I.450/452 (network layer). Line user status and control messages are transmitted according to the X.25 standard, which is an internationally standardized (CCITT) network service interface between data terminal equipment and a packet data network. Support of X.25 terminal equipment over an ISDN network service interface, as employed in the invention, is standardized in CCITT recommendation X.31.

A common basic hardware platform that can be employed for integrated line controller 22, network controller 18 and system operator station 43 is a personal computer or workstation with an ISDN terminal adapter card. For example, the platform can be implemented with an AST model 80386/25 personal computer running Santa Cruz Operations UNIX as a processing platform and a model PC-53 terminal adapter card (from DGM&S, Mt. Laurel, N.J.) with a UNIX driver to provide the ISDN interface. The functional roles for line controller 22, network controller 18, and system operator station 43 are determined by software. The displays for the personal computers or workstations at network controller 18, line controller 22, and system operator 43 can use OSF/Motif as a basis for a user interface. (A less expensive integrated line controller 22 may be based on IBM XT-Class or AT-Class personal computers, but in this case, the line controller software must run on MS/DOS and not UNIX.) Nonintegrated, low-price, line controller 20 can employ ISDN integrated circuits from Advanced Micro Devices, Sunnyvale, Calif. and be programmed as a stand alone application. Other computers (e.g., mainframes or minicomputers) with ISDN interfaces can also be used for network controller 18. A fault tolerant computer available from Stratus or Tandem Computer would be advantageous in providing performance (particularly in large systems) and reliability. Fault tolerant computers provide for continued operation despite system hardware and software failures. Line controllers 20, 22, network controller 18, and the other components of ACP system 10 are programmed to provide the functions described herein.

Figure 2:
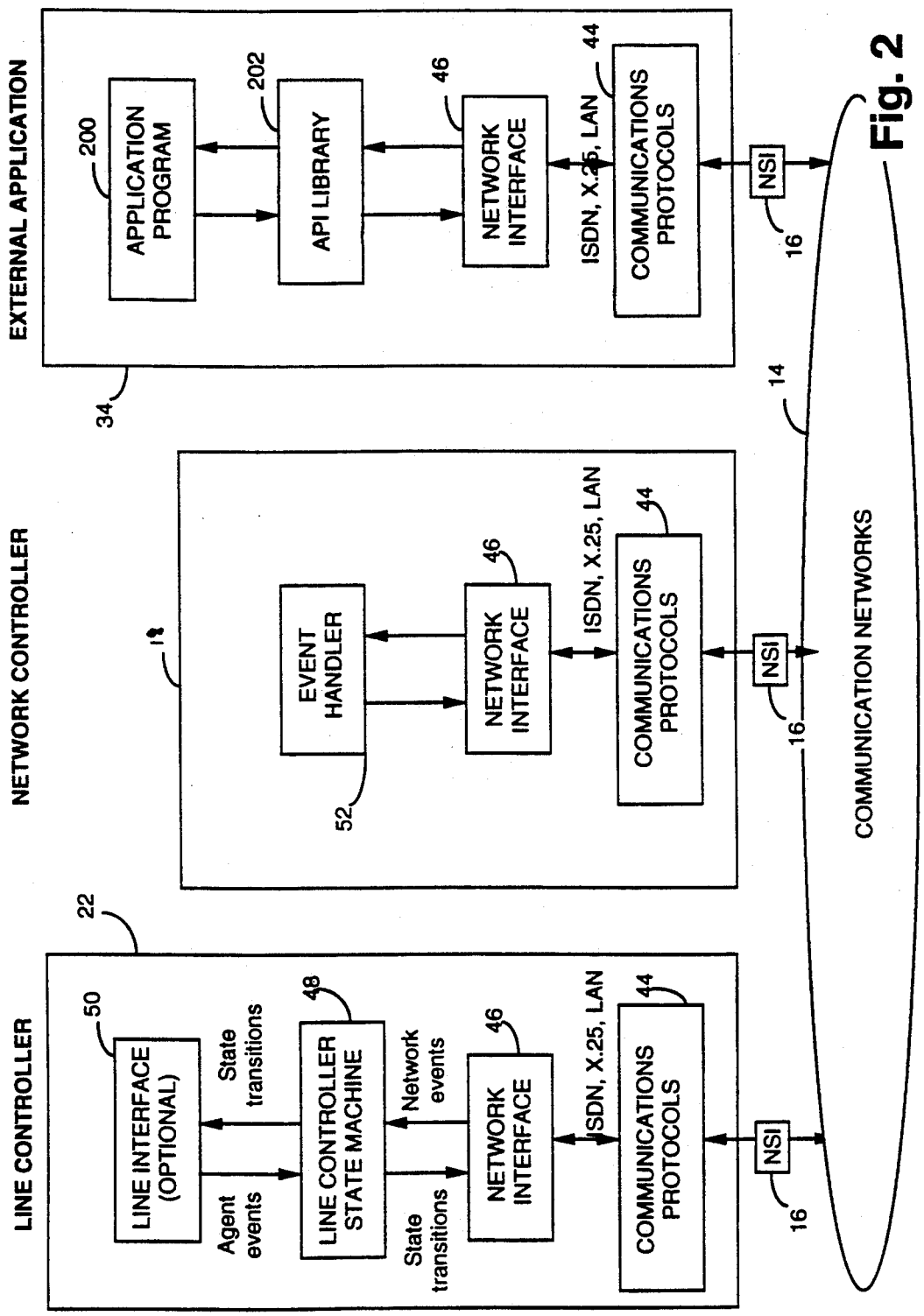
FIG. 2 is a diagram showing the software architecture in the FIG. 1 automatic call processing system.

FIG. 2 shows the software architecture for line controller 22, network controller 18, and an external application in external host computer 34. Line controller has the same architecture as shown for line controller 22. Line controller 22 is typically connected to the network employing a BRI, and network controller 18 can use either a BRI or a PRI.

Communications layer 44 translates the messages coming from network 14 to ISDN events and X.25 events. Communications layer 44 then interfaces to network interface layer 46, which translates the ISDN events and X.25 events to and from the events as seen by the actual ACP application in the line controller state machine 48 and event handler 52.

The functionality of line controller 22 is embodied in line controller state machine 48. The line controller call states are described in FIG. 3. Inputs to and from the line user are managed by the optional line interface subsystem 50, which employs the X-Windows standard in integrated line controller 22. In the preferred embodiment, state changes initiated by the line user are communicated to network controller 18 for screening before they can take effect.

In network controller 18, network interface 46 feeds event handler 52, which tracks the system state as seen by network controller 18. Event handler 52 includes a state manager, which maintains any global state information kept by the network controller. Actions selected by the external application are executed by event handler 52, by means of messages sent to the line controllers to execute the application requests. External host computer 34 includes application program 200 and API library 202. The application program carries out a business operation and calls upon ACP system 10 to execute call processing in support of that business. The application program makes commands relating to call processing that are used to generate third party control messages sent to network controller 18. The functions include those illustrated in FIGS. 5–10 and can also include the functions in API libraries of existing computer vendor products such as IBM CallPath, HP Applied Computerized Telephony, DEC Computer Integrated Telephony and the functions available from switch vendor products such as AT&T ASAI, Northern Telecom CompuCall, ROLM CallBridge, Intecom OAI and the functions identified by ANSI (standards group) Switch to Computer Application Interface (SCAI) and ECMA (standards group) Computer Supported Telecom. Application (CSTA).

For example, the functions supported by the SCAI interface and the call processing information provided to the application are as follows:

Functions Invoked by the Application on the Network

Answer call—answer a call which has been offered to a device

Clear call—release all devices from a call

Clear connection—release a specified device, e.g., remove one leg of a conference Conference call—establish a call between two devices Hold call—put a call on hold Make call—establish a call between two devices Retrieve call—reestablish interrupted communications on a held call Transfer call—establish a call to a device and move an existing call to it Set feature—control the status of a device attached to a switch Query feature—request the status of a device to a switch Predictive make call—connect caller to destination on answer Information Provided by the Network to the Application Service initiated—a device attached to the network is going off-hook Call originated—a call has been initiated Call delivered—a device is being alerted (equivalent to ringback)

Call established—a device has answered a call

Call presented—a call has been assigned to a device (not yet ringing)

Call received—a call is ringing at a device

Call cleared—a call has ended

Call failed—a call cannot be completed

Call conferenced—a device has been added to an existing call

Call held—a device's participation in a call has been interrupted

Call retrieved—participation in a call has been reestablished

Call transferred—a call has been transferred from one device to another

Diverted event—a call has been rerouted, e.g., because of forwarding

Network reached—a call has left the SCAI network

Route request—call processing has been interrupted waiting for computer response In what follows, we describe make call, conference call and transfer call functions as examples of call processing operations implemented by this invention.

Operation

Figure 3:
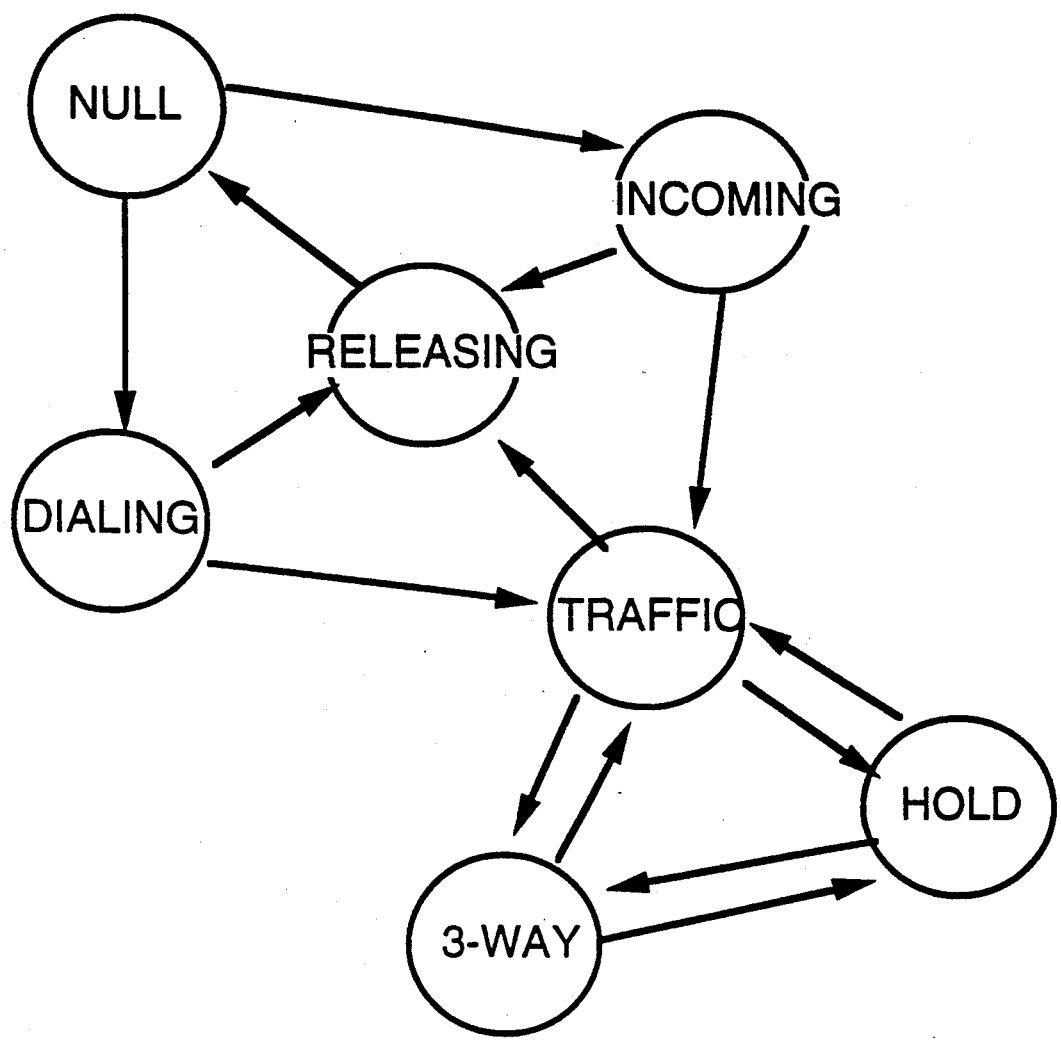
FIG. 3 is a diagram of the line controller states and transitions for a line controller of the FIG. 1 system.

Before discussing the typical operation of ACP system 10 in call processing, the call states for the line controllers will be discussed in detail, with reference to the call state diagram of FIG. 3. The line controller transitions through a number of call states which define the action it can perform on behalf of network controller 18. Each change in state may or may not involve a change of display screen in optional line interface 50. The network controller 18 can initiate state transitions by sending appropriate control messages; a line user (if present) can also initiate state transitions by interacting with command keys provided at the interactive display of the line controller. State transitions can also occur based on network call activity as noted below. In FIG. 3, call states are shown in circles. All changes of state at line controllers 20, 22 are reported by X.25 messages to network controller 18. Messages sent to the controller may reflect both the state change and the specific transition to provide detailed information to the external application. The states, which are described below, can also be subdivided if additional detail is desired. The parenthetical comments following the names of the states below indicate the call-related activity.

State Descriptions

NULL

The NULL state indicates no current call activity.

INCOMING (Call presented)

The INCOMING state indicates that a Set-up message has been delivered from the network. This state transitions either to TRAFFIC in the case that the call is answered, or to RELEASING in the case of failure to answer.

TRAFFIC (Call established)

The Traffic State indicates an active answered call. It can be reached either from INCOMING (for a call from the network) or from DIALING (for an outgoing call). Transitions out of TRAFFIC occur either in the case of disconnect from either end (to RELEASING) or in the case the services of HOLD or transfer/conference (3-WAY) are invoked on the line.

HOLD (Call held)

The HOLD state indicates that the call is held in the network but is not currently connected to a channel on the line. The call can be restored to the TRAFFIC state by the retrieve action.

3-WAY (Conference, Transfer)

The 3-WAY state indicates that the call is connected to more than one external party. This can be a conference or a transfer activity that has not yet completed. Possible transitions are either back to TRAFFIC (by releasing the additional parties) or to HOLD.

RELEASING (Call failed, call cleared)

The RELEASING state indicates that a call has failed to connect or has terminated and hence all resources are being disassociated from the call for transition to NULL. RELEASING can be entered from failures of INCOMING or DIALING calls or from disconnect of TRAFFIC calls.

DIALING (Call originated)

The DIALING state indicates initiation of an outgoing call. Transitions are either to RELEASING in the case of call failure or to TRAFFIC in the case of successful call set-up.

In operation, ACP system 10 works with other data processing systems specific to the ACP business (e.g., billing or inventory) carried out by external host processor 34. When application program 200 in external computer 34 decides to have system 10 perform a call processing operation, it accesses its API library 202 and transmits third party control messages to network controller 18. Network controller 18 then determines what first party steps need to be taken by the line controller or controllers 20, 22 to execute the desired call operation, generates first party control messages to carry out the steps, and sends the first party control messages via the message transfer interfaces to the appropriate line controllers 20, 22. The line controllers so instructed then execute the first party steps by requests over the call control interfaces to the telephone network 14, thereby effecting the desired ultimate call operation on network 14.

Figure 4:
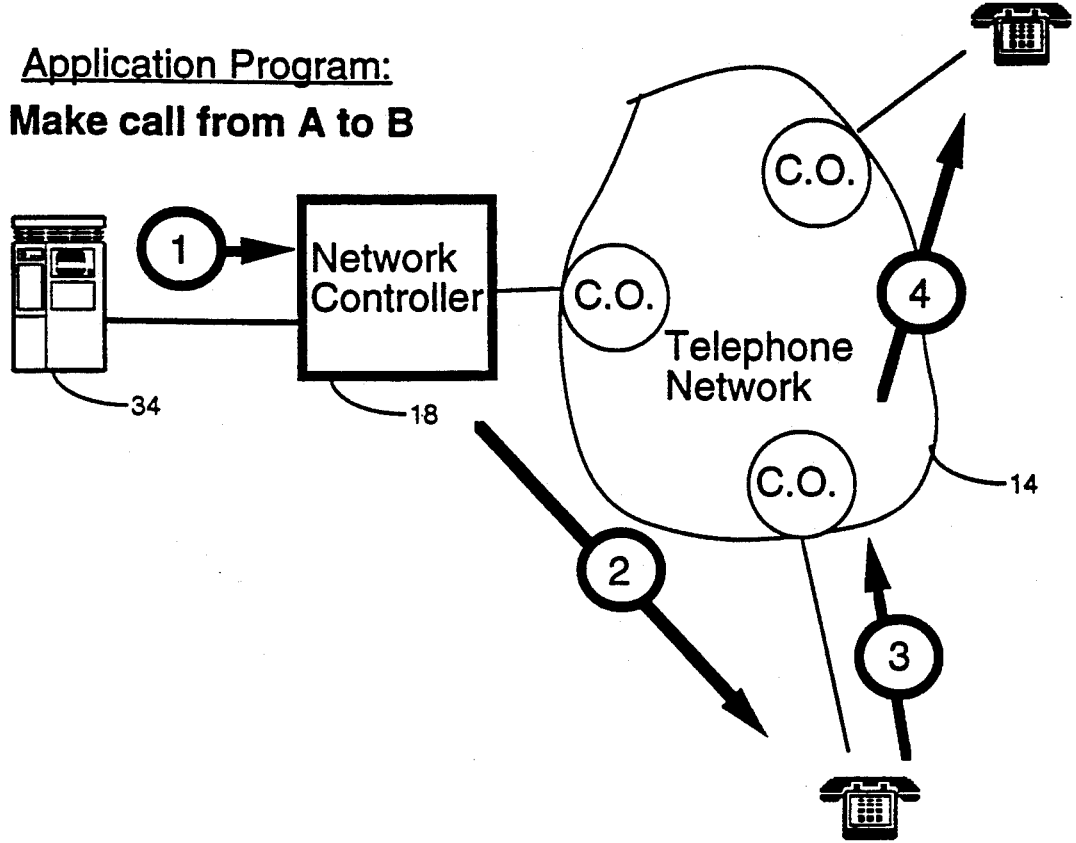
FIG. 4 is a diagram illustrating the handling of a call set-up on the FIG. 1 automatic call processing system.
Figure 5:
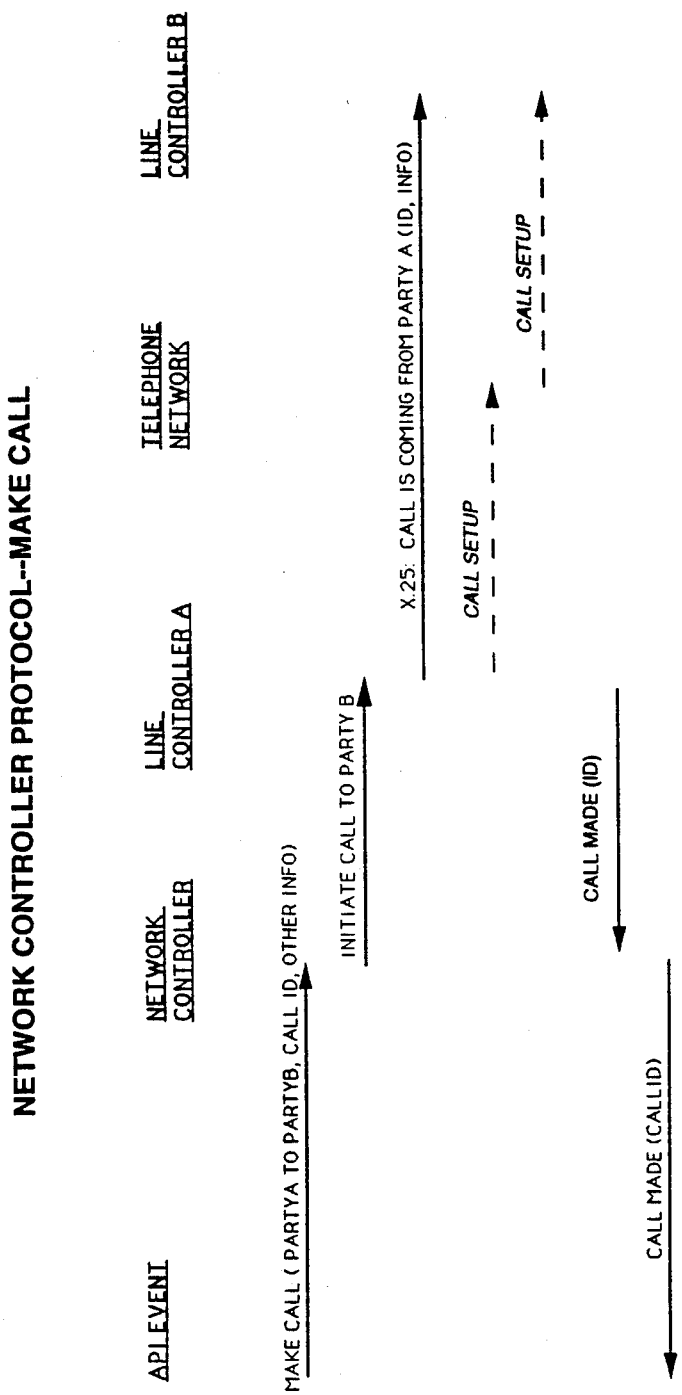
FIGS. 5-10 are diagrams illustrating different processing operations carried out by the FIG. 1 system.

FIGS. 4 and 5 illustrate and describe the messages between and the actions of external application 200, network controller 18 and two line controllers associated with parties A and B in executing the call operation of making a call from party A to party B. External application program 200 accesses the application program interface library 202 to request that the system make a call from line A to line B. In this example, the external application program is on an external processor 34 and makes its process request using the API library 202 on that processor. (On FIG. 5, the interaction with external application 200 is indicated as "API Event".) This results in a third party control message (via interface 36 in FIG. 4) to the network controller 18 (indicated by "1" in FIG. 4). The message also includes a call ID number and other information depending upon the particular application program. (See FIG. 5.) Network controller 18 then determines what first party control messages must be passed to what line controller or line controllers in order to realize the call processing request. In this example, the line controller at A=617-234-5678 must establish a call to the line controller at B=213-234-5678. Network controller 18 sends a first party control message (via the X.25 message transfer interface) commanding the line controller at A to establish a call to the line controller at B. (This is indicated by "2" on FIG. 4.) The line controller at A then sends a request via its call control interface to a central office ("C.O.") switch to request that the desired telephone network connection be established. As indicated on FIG. 5, there first is a message sent via the message transfer interface (X.25 in this example) from the line controller at A to the line controller at B; the message indicates that a call is coming from party A and includes the call identification and other information. The call is then set up from the line controller at A to the telephone network ("3" on FIG. 4) and from the telephone network to the line controller at B ("4" on FIG. 4). When the line controller at A receives an acknowledgement from the network, it sends a status message (X.25) indicating that the call has been initiated to party B and including an ID of the call to the network controller. This information is passed on from network controller 18 to external application program 200. Network controller 18 thus receives state information from all line controllers so that it can verify the success of the transaction, recover if necessary, and report back to the external application accordingly. In the particular example shown on FIG. 4, three separate central offices in public telephone network 14 are involved in establishing this call.

The "make call" function shown on FIGS. 4 and 5 can also be used from line controller A to an outside telephone. The only difference is that the X.25 "call is coming" message will not be sent, since the outside telephone will not have an X.25 connection to receive it.

Figure 6:
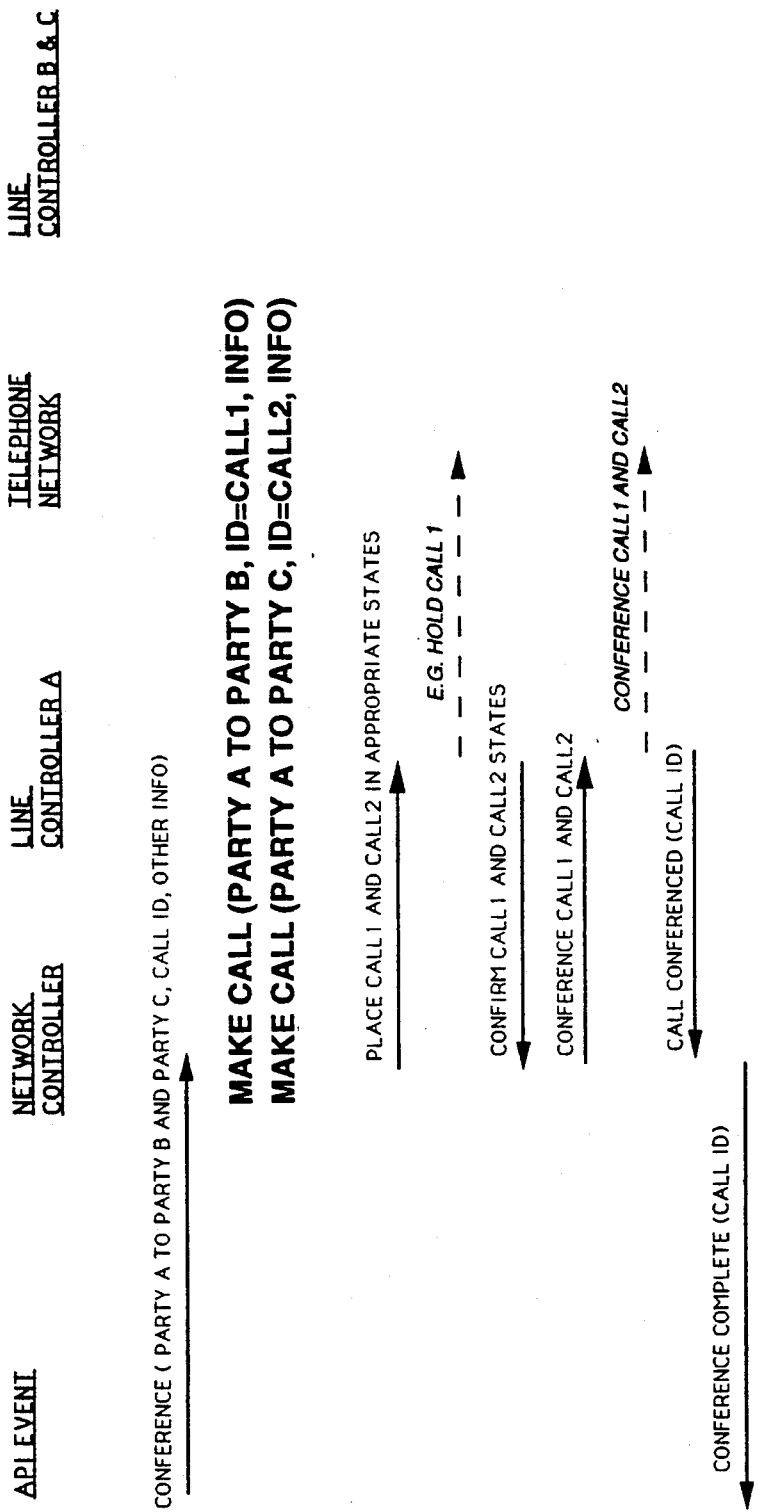

FIG. 6 shows the procedure for requesting that a conference call be set up for new calls. The external application sends a third party control message to network controller 18 to establish a conference of parties A, B, and C, the message also including a call ID and additional information. Network controller 18 then creates the first party control message to establish a call (designated "Call 1") between party A and party B according to the process described in detail on FIG. 5. Network controller 18 then similarly generates the first party control message shown on FIG. 5 in order to establish a call (designated "Call 2") from party A to party C. Network controller 18 then sends a first party control message to the line controller at A to have calls 1 and 2 placed in the appropriate states; in this example, call 1 is assumed to be answered and placed on hold. The line controller at A does this by a request to telephone network 14. The line controller at A then confirms the call 1 and call 2 states with a message to network controller 18, and network controller 18 sends a first party control message telling the line controller at A to conference calls 1 and 2. The line controller at A then requests telephone network 14 to conference calls 1 and 2, and sends confirmation to network controller 18. Network controller 18 then sends a conference complete message to the external application.

Figure 7:
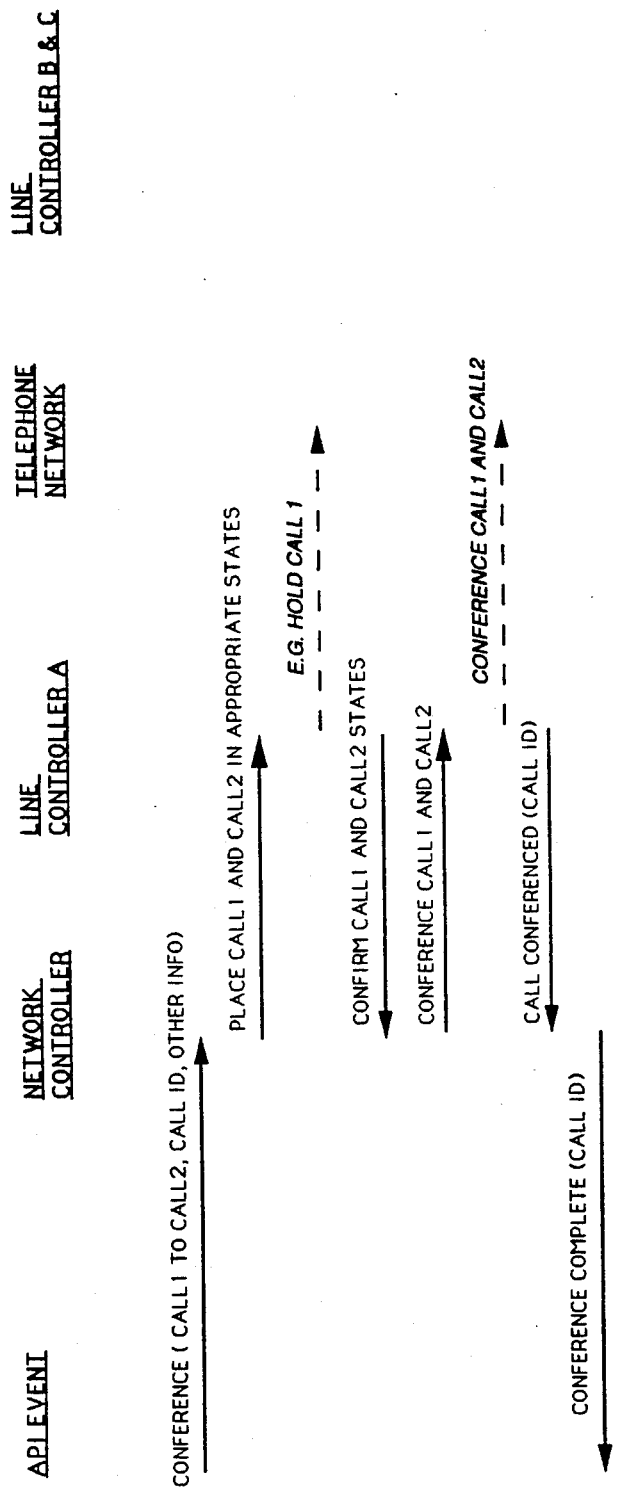

Referring to FIG. 7, the messages and actions associated with establishing a conference call are shown for the case when the system has first established two calls designated call 1 and call 2 in FIG. 7. For example, call 1 could be from party A to party B, and call 2 could be from party A to party C. With these two calls in process, the external application sends a third party control message to network controller 18 to establish a conference of call 1 to call 2 and assigns a call ID number. The message to network controller 18 also includes other information depending upon the particular application program. Network controller 18 then sends a first party control message telling the line controller at A to place the two calls in the appropriate states, for example, holding call 1. The line controller at A then confirms the call and establishes a conference call, and confirmations are sent, similar to the remainder of the steps in FIG. 6.

Figure 8:
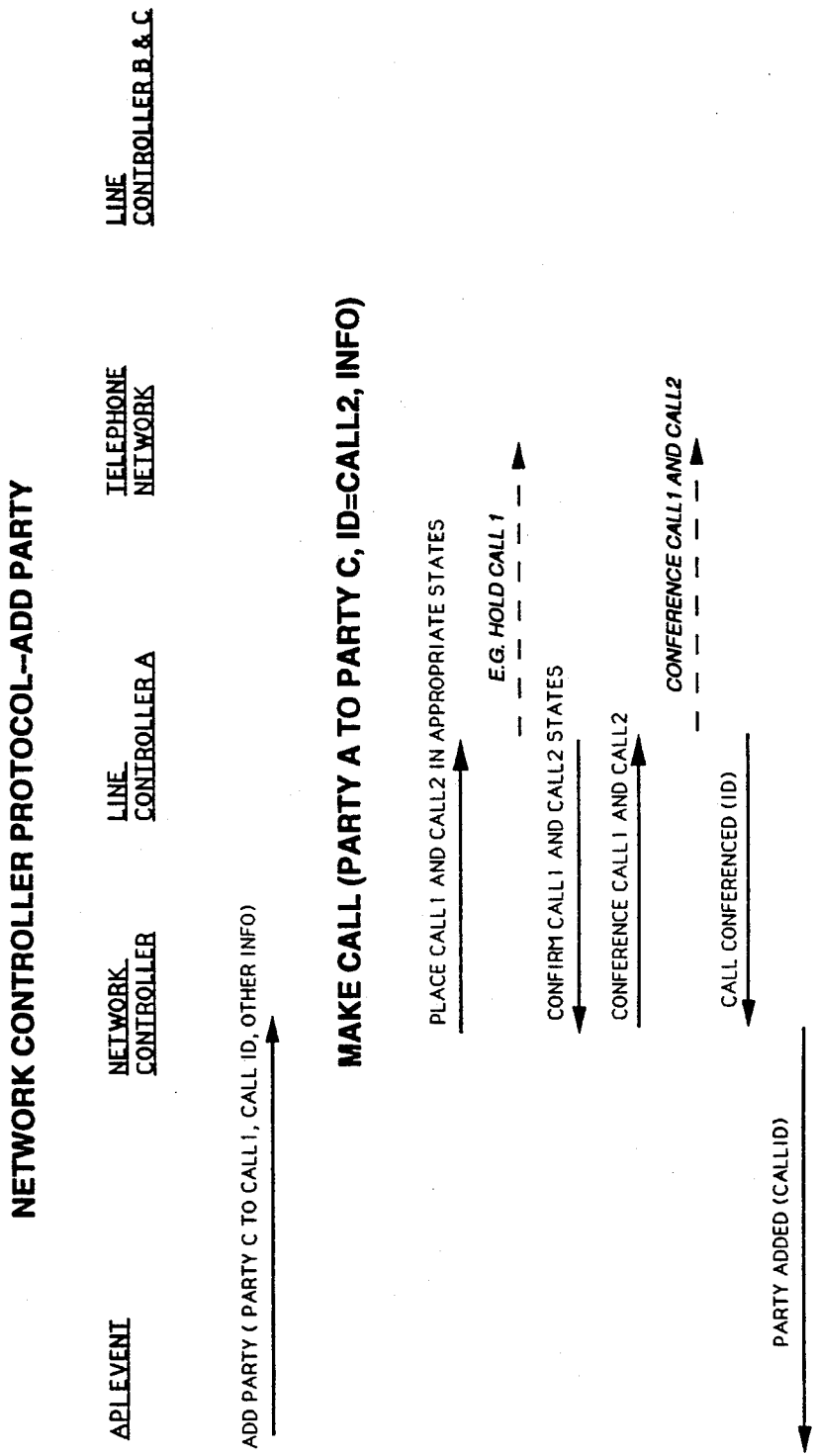

Referring to FIG. 8, the procedure for the call process of adding a party is shown. This procedure is used when a call is already in progress, here between parties A and B and designated call 1, and party C will be added to call 1. The message including this information is sent from the external application to network controller 18. Network controller 18 sends out the first party control messages on FIG. 5 in order to establish a call between party A and party C and gives the ID call 2 to this new call. Network controller 18 then proceeds according to the conference establishing procedures already described on FIGS. 6 and 7, which has the effect of adding party C to original call 1.

Figure 9:
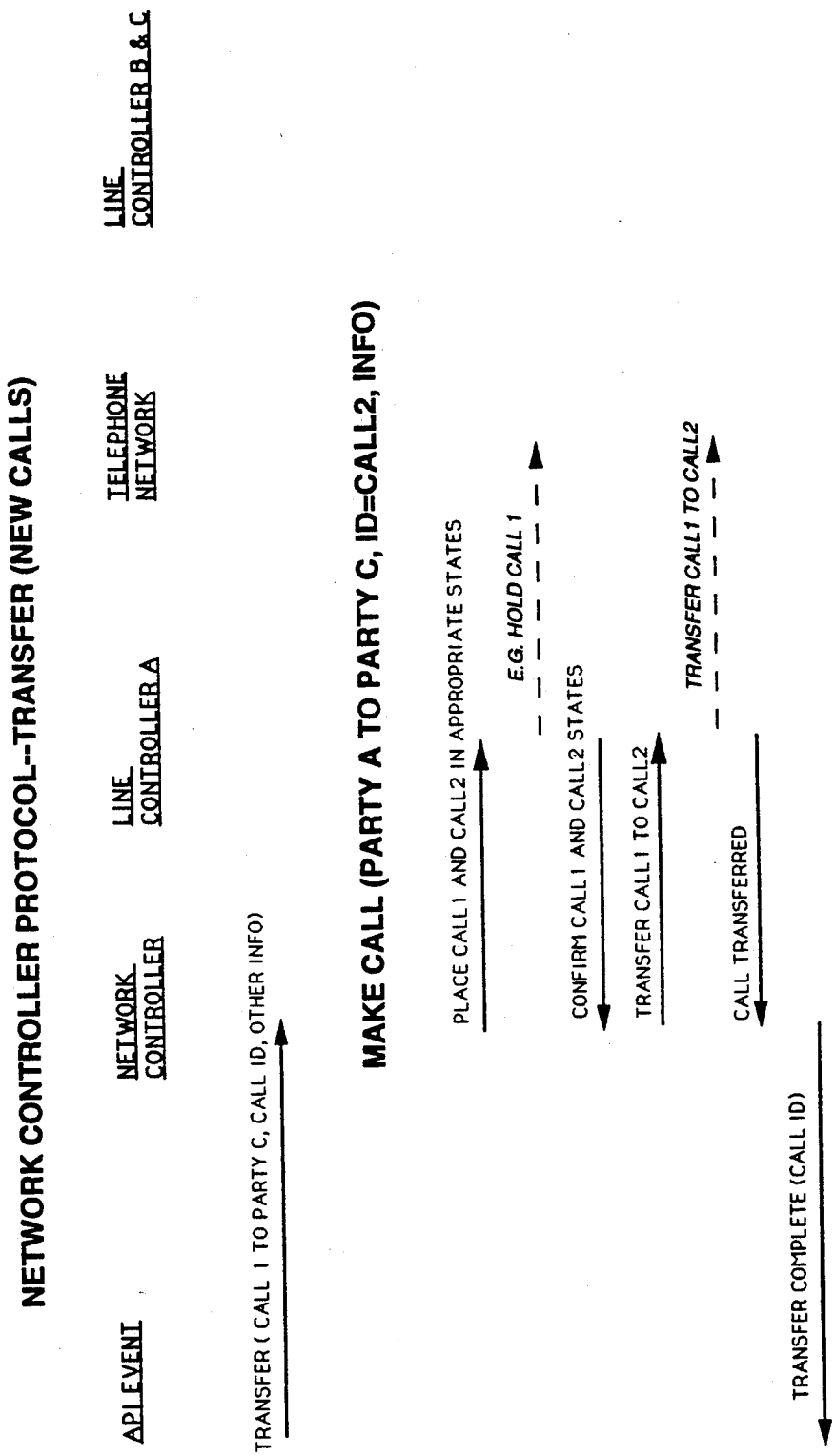

Referring to FIG. 9, the procedure is shown for transferring a call. In this particular case, party A is at a line controller and thus is part of ACP system 10. Parties B and C are normal telephones connected to the network and do not have the capabilities of a line controller. The external application sends a third party message to network controller 18 to transfer a call from party 1 to party 2 and party 3. In this instance, network controller 18 sends out the first party control messages to cause a first call to be made between party A and party B and second call to be made between party A and party C according to the procedures shown on FIG. 5. These calls are then placed in the appropriate states, for example, on hold, and the states are confirmed to network controller 18. Network controller 18 then sends a first party control message telling the line controller at A to transfer call 1 to call 2, which, e.g., can be implemented by establishing a conference call and then dropping out of the conference. Network controller 18 then sends a transfer complete message to the external application.

Figure 10:
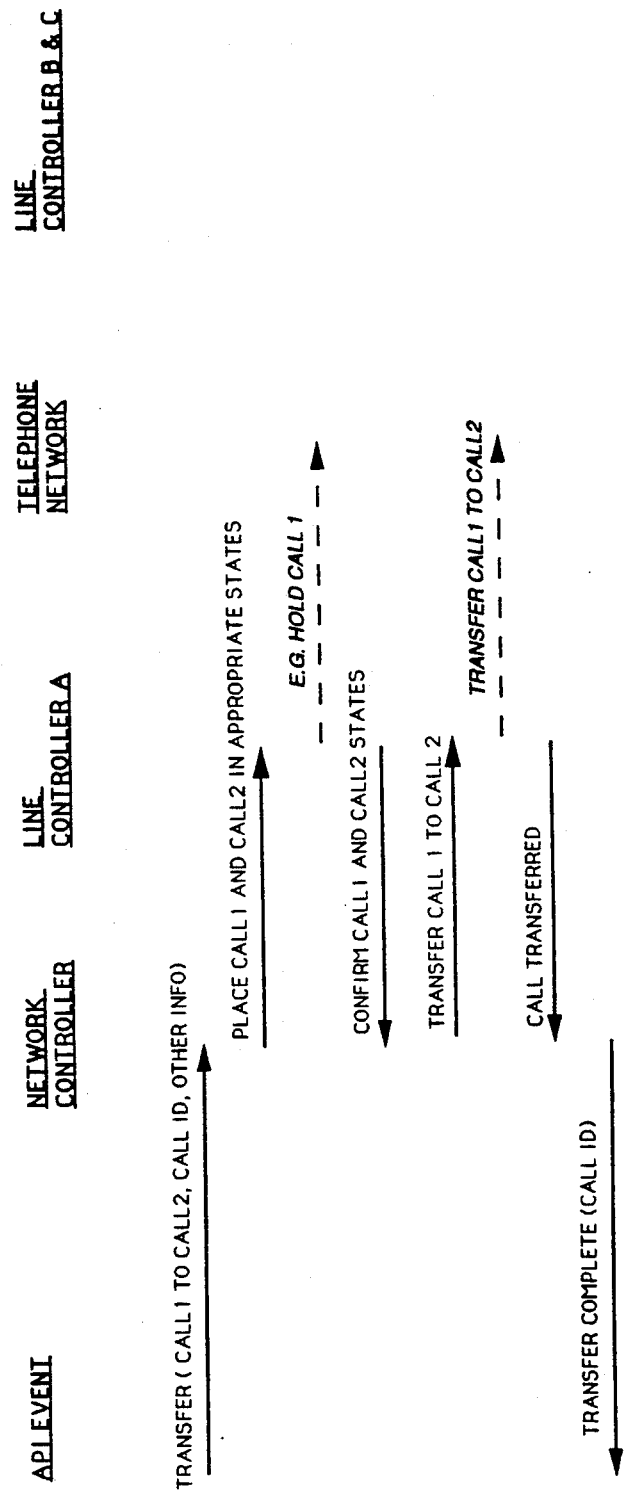

Referring to FIG. 10, the procedure is shown for transferring calls when there are existing calls. In this case, the external application sends a third party control message to network controller 18 telling it to transfer call 1 to call 2, the message including the call ID and other information. In this case, call 1 and call 2 are then placed in the appropriate states, for example, putting call 1 on hold, and the call is transferred as it was in the FIG. 9 procedure.

Other Embodiments

Other embodiments of the invention are within the scope of the following claims.

In addition to control of a call operation on a voice communication network, the invention can be used to allow an external computer to control communication operations on other kinds of networks or combinations of networks. By call processing we therefore mean the association of call origin and call destination points for communication across a network, regardless of the form in which the information is transmitted.

Besides the ISDN interface, other network service interfaces and other message transfer interfaces and call control interfaces can work so long as they have the necessary functionality as described herein. In particular, the communication of messages between the components of the ACP can take place over a network that is entirely distinct and physically separate from the network that is used for calls.

Network control by the network service interface may include: (1) data, image, or video networks; (2) circuit-switched connections, packet-switched connections, frame-relay connections, cell-relay connections, other associations between endpoints whether explicitly connection-oriented or not; (3) local area networks (LAN's) such as Ethernet, Token Ring, fiber distributed data interface (FDDI); (4) wide area networks (WAN's) such as X.25, switched multimegabit data service (SMDS), broadband ISDN (B-ISDN), QPSX (metropolitan area network developed by the Australian Operating Administration); and (5) combinations of the networks just described. Networks may be either public or private, including PBX's or virtual private networks (i.e., networks that are provided by the telephone company but appear to the user to be private networks), or any LAN/WAN combination of public and private data networks.

The network service interface itself may be a combination of other network interfaces. For example, the connection transmission function (e.g., voice communication) and the connection control function (e.g., signalling for voice connection control) may be realized by distinct networks with distinct network interfaces (e.g., in using a LAN for message signalling to a connection server).

The communication between the network controller and the line controller only needs the ability to pass commands and responses. Hence, this needs only to be a message transfer interface, such as an X.25 or SNA network or any local area network or wide area network capable of passing message information. Some of the communication could also be by user-to-user signalling service, as being standardized by standard group T1S1 and documented in T1S1.1 89-144 Apr. 25, 1989. Because the network controller communicates directly with the line controllers, the network interface does not provide any specialized function (such as line user monitoring) related to the operation of the ACP.

The invention can also be used to allow an external computer to control attached resources as well as the call operation connections themselves. This includes control of: (1) human agents attached to communications networks; and (2) control of automated devices such as voice response units (VRUs) or telefax machines.

Multiple external computers could access the network controller, which could mediate between requests according to first-come first-serve or other logic. In this way, the network controller acts as a global telecommunications resource controller for competing external processes. This is useful, for example, in the case of a desktop communications system where each human user's telephone call controller may attempt to establish connections to others based upon availability. By invoking the services of the network controller, the desktop communications program would become aware of the unavailability of other connections or resources and hence could take alternative actions. Furthermore, a desktop unit could combine the functions of line controller and external processor. In this way a user or a user process could: (1) manage its own calls at the line controller: (2) make its resources available to other desktops through the network controller; (3) monitor the rest of the system and execute system control actions as an external process interacting with the network controller. In this case, if a combined line controller/external application needs to access another line controller, it does so by communicating with the network controller.

External processes do not necessarily have to interface with the system via a formal application programming interface (API) such as CallPath or ACT. They can formulate and send messages directly to the network controller, instead of relying on the API to simplify the sending of the messages.

The line controllers can have different call states than those shown on FIG. 3; what is important for practice of the invention is that the line controller perform a call processing function on behalf of the overall system under the control of the network controller. The additional call states can include those identified by the CCITT red and blue books, the T1S1 standard, the Bell Core standard, ATT5E4, and NT BCS-28.

Multiple network controllers 18 may be used in large system configurations, and system operator functions may be combined with line controller functions if a system operator is to act as an line user.

The different network controller functions may be split up and placed at different locations on the network; e.g., the external application interfacing part of the network controller may be implemented on one processor, and the remaining portions of the network controller may be implemented on a different processor communicating via message transfer interfaces.

What is claimed is:

1. A system for external control of call processing on a call connection network comprising
   a network controller that is connected to receive an external party control message regarding a call connection operation to be executed by and involving one or more line controllers each connected to said call connection network by a call connection interface, said network controller being programmed to respond to said external party control message to determine what first party steps need to be taken by said line controller or controllers to execute said call connection operation, to generate first party control messages to carry out said first party steps, and to send said first party control messages over a message transfer network via message transfer interfaces to one or more said line controllers, said message transfer network being the same as or different from said call connection network, and
   said one or more line controllers,
      each said line controller being connected to said message transfer network via one of said message transfer interfaces to receive said first party control messages,
      each said line controller being connected to said call connection network via said call connection interface permitting said line controller to participate in a call over said call connection network with another line controller or other terminal device connected to said call connection network.
      each said line controller being connected to said call connection network via a call control interface permitting said line controller to request said call connection network to execute said call connection operation,
      each said line controller being programmed to execute said first party control messages on behalf of itself on said call connection network in order to execute said call connection operation on said call connection network.

2. The system of claim 1 wherein said call connection network is a public telephone network.

3. The system of claim 1 wherein said call connection network on which said call operation is executed is a private telephone network.

4. The system of claim 1 wherein said call connection network on which said call operation is executed is part of a combination of networks.

5. The system of claim 4 wherein said combination includes private and public telephone networks.

6. The system of claim 1 wherein a single network is sued for sending said first party control messages and executing said call connection operations.

7. The system of claim 6 wherein said line controller and network controller are connected to said single network via respective ISDN interfaces.

8. The system of claim 6 wherein said line controllers and network controller are connected to said single network via respective FDDI interfaces.

9. The system of claim 1 wherein said message transfer network is a local area network.

10. The system of claim 9 wherein said local area network is an Ethernet network.

11. The system of claim 9 wherein said local area network is a token ring network.

12. The system of claim 9 wherein said local area network is an FDDI network.

13. The system of claim 1 wherein said message transfer network is a wide area network.

14. The system of claim 13 wherein said wide area network is an X.25 network.

15. The system of claim 13 wherein said wide area network is an SMDS network.

16. The system of claim 13 wherein said wide area network is a B-ISDN network.

17. The system of claim 13 wherein said wide area network is a QPSX network.

18. The system of claim 1 wherein said message transfer network is part of a combination of networks.

19. The system of claim 1 wherein said line controller is implemented on a personal computer or a workstation.

20. The system of claim 1 wherein said network controller is implemented on a personal computer or a workstation.

21. The system of claim 1 wherein said network controller is implemented on a mainframe or a minicomputer.

22. The system of claim 1 wherein one of said plural line controllers is implemented on a device that has a dedicated function of control of communication via a said message transfer interface.

23. The system of claim 1 further comprising an automated agent connected to said line controller.

24. The system of claim 1 wherein said line controller further comprises an interactive display terminal for interacting with a human.

25. The system of claim 1 further comprising an external host processor containing applications programs relating to call processing and information as to a business supported by said system for external control of call processing, said processor being connected to provide external party control messages to said network controller.

26. The system of claim 1 wherein a common platform implements said network controller, contains applications programs relating to call processing, and generates said external party control messages.

27. The system of claim 1 wherein a common platform implements one of said plural line controllers, contains applications programs relating to call processing, and generates said external party control messages, said platform being connected to provide external party control messages to said network controller.

28. The system of claim 1 further comprising a system operator station connected to receive information as to the operation of said system for external control of call processing from said network controller and to provide control signals to said network controller.

29. The system of claim 28 wherein said system operator station includes an interactive display for displaying said system information and receiving inputs to generate said control signals.

30. The system of claim 1 wherein said call operation relates to a connection for communication involving transmission of digital data signals.

31. The system of claim 1 wherein said call operation relates to a connection for communication involving transmission of voice, image or video signals.

32. The system of claim 1 wherein said call operation relates to a circuit-switched connection, packet-switched connection, frame-relay connection, or cell-relay connection.

33. The system of claim 1 wherein said network controller includes a communications layer, a network interface, and an event handler, said event handler receiving said external party control messages and generating said first party control messages.

34. The system of claim 1 wherein said line controller includes a communications layer, a network interface, and a line controller state machine.

35. The system of claim 34 wherein said line controller state machine includes call states of a null state, a dialing state, an incoming state, a releasing state, and a traffic state.

36. The system of claim 35 wherein said state machine includes call states of a three-way state and a hold state.

37. The system of claim 25 wherein said external processor includes an API library accessed by said application program to generate said external party control messages.

38. The system of claim 26 or 27 wherein said platform includes an API library accessed by said application program to generate said external party control messages.

39. The system of claim 1 further comprising an electronic device attached to said line controller, and wherein said network controller is programmed to generate messages transmitted over said message transfer interface to said line controller to control said electronic device.

40. The system of claim 39 wherein said electronic device is a voice response unit.

41. The system of claim 39 wherein said electronic device is a telefax machine.

42. The system of claim 1 wherein said line controller includes an interactive display for interacting with a human, and wherein said network controller is programmed to generate messages transmitted over said message transfer interface to said line controller to control or monitor actions of a human at said interactive display.

43. The system of claim 1 wherein said first party control messages include initiating an outgoing call over said call connection network.

44. The system of claim 1 wherein said first party control messages include receiving an incoming call over said call connection network.

45. The system of claim 1 wherein said first party control messages include transferring a call to another destination.

46. The system of claim 1 wherein said first party control messages include putting a call on hold.

47. The system of claim 1 wherein said first party control messages include retrieving a call.

48. The system of claim 1 wherein said first party control messages include clearing a connection.

49. The system of claim 25 or 26 wherein said network controller is connected to receive status messages from said line controllers via said message transfer interfaces and to provide information on status of calls and line controllers to said application programs.

50. The system of claim 1 further comprising a plurality of external host processors containing applications programs relating to call processing, said processors being connected to provide external party control messages to said network controller.

51. The system of claim 50 wherein said network controller mediates between competing requests from said external host processors by first-come first-serve logic.

52. The system of claim 50 wherein said external host processors each have an interactive display for interacting with a human.

53. The system of claim 52 wherein said network controller receives status messages from said line controllers indicating availability of said line controllers for call processing.

54. The system of claim 53 wherein said network controller mediates between competing requests from said external host processors.

55. The system of claim 1 wherein a platform implements one of said plural line controllers, contains applications programs relating to call processing, and generates said external party control messages, said platform being connected to provide external party control messages to said network controller and having an interactive display for interacting with a human.

56. The system of claim 55 wherein a plurality of said line controllers contain applications programs relating to call processing and generating said external party control messages, said platforms being connected to provide external party control messages to said network controller and each having an interactive display for interacting with a human.

57. The system of claim 56 Wherein said network controller receives status messages from said line controllers indicating availability of said line controllers for call processing.

58. The system of claim 57 wherein said network controller mediates between competing requests from said application programs associated with different line controllers.

* * * * *

UNITED STATES PATENT AND TRADEMARK OFFICE
CERTIFICATE OF CORRECTION

PATENT NO. : 5,291,492
DATED : March 1, 1994
INVENTOR(S) : G. Wayne Andrews et al.

It is certified that error appears in the above-indentified patent and that said Letters Patent is hereby corrected as shown below:

Col. 1, line 48, after "network", insert --"External party control message" as used herein has the same meaning as "third party control message"--.

Col. 5, line 17, after "controller", insert --20--.

Col. 12, line 40, "sued" should be --used--.

Col. 16, line 3, "Wherein" should not be capitalized.

Signed and Sealed this

Thirty-first Day of October 1995

Attest:

BRUCE LEHMAN

*Attesting Officer*  *Commissioner of Patents and Trademarks*